United States Patent [19]

Caron

[11] 3,750,106

[45] July 31, 1973

[54] VARIABLE FUNCTION MAGNETIC DOMAIN ARRANGEMENT

[75] Inventor: Lionel Caron, Holmdel, N.J.

[73] Assignee: Bell Telephone Laboratories, Incorporated, Murray Hill, N.J.

[22] Filed: Aug. 2, 1971

[21] Appl. No.: 168,166

[52] U.S. Cl. .............................................. 340/172.5

[51] Int. Cl. .............................. G06f 1/00, G11c 5/02

[58] Field of Search ..................... 340/172.5, 174 TF

[56] References Cited

UNITED STATES PATENTS 3,460,116 8/1969 Bobeck et al. ...................... 340/174

OTHER PUBLICATIONS

Spain, R. J., "Controlled Domain Tip Propagation Part I," Journal of Applied Physics, Vol. 37, No. 7, June 1966, pp. 2572–2583.

Spain, R. J. and Jauvtis, H. I., "Controlled Domain Tip Propagation Part II," Journal of Applied Physics, Vol. 37, No. 7, June 1966, pp. 2584–2593.

Spain, R. J., "Domain Tip Propagation Logic," IEEE Transactions On Magnetics, Vol. Mag-2, No. 3, September 1966, pp. 347–351.

Almasi, G. S. and Genovese, E. R., "And/Or Combinatorial Bubble Domain Logic Device," IBM Technical Disclosure Bulletin, Vol. 13, No. 6, November 1970, pp. 1410.

Genovese, E. R., "Combination And/Or Logic Device," IBM Technical Disclosure Bulletin, Vol. 13, No. 6, November 1970, pp. 1522–1523.

Lin, Y. S., "Bubble Domain Logic Devices," IBM Technical Disclosure Bulletin, Vol. 13, No. 10, March, 1971, pp. 3068–3068a.

*Primary Examiner*—Raulfe B. Zache

*Attorney*—W. L. Keefauver et al.

[57] ABSTRACT

A magnetic domain variable function arrangement is realized by a magnetically soft overlay geometry which controls the movement of single wall domains in a slice of magnetic material in response to a reorienting magnetic field. The overlay geometry defines first and second input channels, an output channel and control channels connecting the input channels in synchronous relationship with each other and with the output channel such that coordinated domains propagated along the input channels in a first specifically timed relationship cause subsequently propagated input domains to provide output domains on the output channel only when the input domains are in an AND relationship with each other. The overlay geometry is arranged to provide output domains corresponding to an EXCLUSIVE OR relationship between input domains after a second timed relationship between input domains is detected. Other functions are also provided under control of other timed relationships.

27 Claims, 12 Drawing Figures

United States Patent [19]
Caron
[11] 3,750,106
[45] July 31, 1973
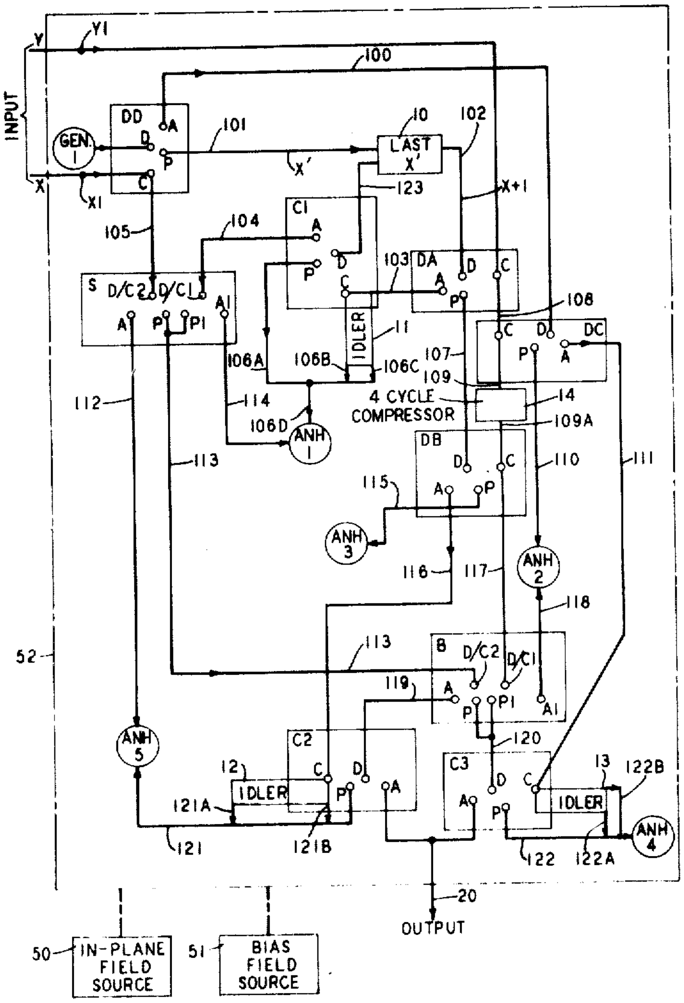

FIG. 2
| SYMBOL | FUNCTION | CONTROL DOMAINS | CYCLE DIFFERENCE Y LAGS X SY | LAG CYCLE COMPARE POINT |
|---|---|---|---|---|
| XY | AND | C2 | 6 CYCLES | DB |
| X⊕Y | EXCLUSIVE OR(XOR) | C3 | 4 CYCLES | DC |
| X+Y | OR | C2,C3 | 6 & 4 CYCLES | DB,DC |
| X′ | INVERTED X | C1 | 2 CYCLES | DA |
| X′Y | INVERTED X AND | C1,C2 | 2&6 CYCLES | DA, DB |
| X′⊕Y | INVERTED X XOR | C1,C3 | 2 & 4 CYCLES | DA,DC |
| X′+Y | INVERTED X OR | C1,C2,C3 | 2 ,6 &4 CYCLES | DA,DB,DC |
FIG. 3
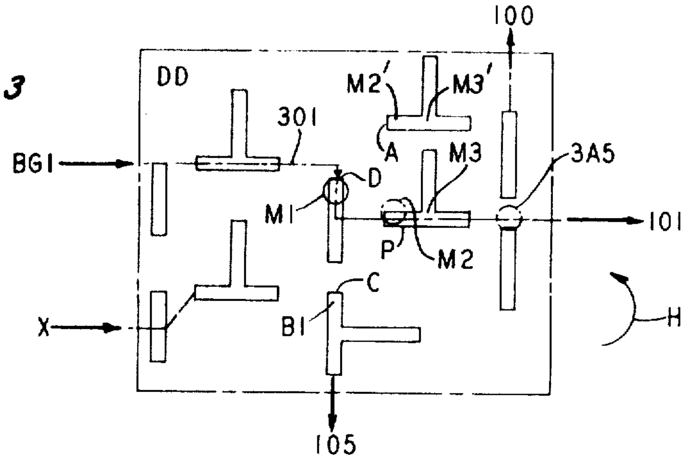
FIG. 4
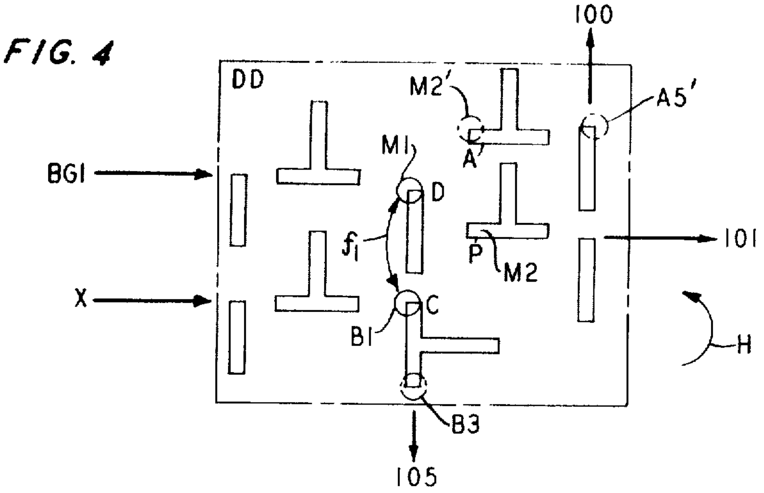

VARIABLE FUNCTION MAGNETIC DOMAIN ARRANGEMENT

BACKGROUND OF THE INVENTION

This invention relates to arrangements for selectively providing output signals in response to various functional relationships between input signals, and more particularly to such arrangements utilizing single wall magnetic domain technology.

The controlled movement of single wall magnetic domains, or bubbles, in a slice of magnetic material in response to a reorienting magnetic field is taught by A. H. Bobeck in U.S. Pat. No. 3,460,116 issued Aug. 5, 1969. Typically, the movement of the domains is controlled by the juxtaposition of a magnetically soft overlay with a surface of the material in which the domains are propagated. The overlay elements are constructed in such a manner that different points become magnetically attractive at different magnetic field reorientations thereby defining a path or channel which is followed by a domain. One such overlay, commonly referred to as a T and Bar overlay, is detailed in the above-mentioned Bobeck patent and is arranged to control the movement of magnetic domains in response to a reorienting magnetic field, illustratively having four quadrants, or reorientations, per cycle of rotation.

The usefulness of any such device depends upon the geometry of the respective elements with respect to each other. Thus the elements are advantageously arranged to take advantage of the fact that all domains in a slice of magnetic material under the influence of the same rotating field will propagate through that material in synchronous relationship with each other. Accordingly, domains which are propagated along different paths will arrive at certain points of the overlay in a predetermined coordinated relationship. This physical control of magnetic domains in spatial coordination coupled with the interaction forces between domains in close relationship with each other permits consecutive logic operations to be performed between corresponding representations of different sets of information representations solely within magnetic domain technology if the representations are organized in a form to capitalize on those properties. One such organization which supplies signals representative of a change in status of any one of a snumber of telephone lines is illustrated in copending application Ser. No. 89,631 filed Nov. 16, 1970 of A. J. Perneski and R. M Smith.

Taking advantage of the fact that the physical location of any magnetic domain in such a device is definable in terms of a discrete preset element patterns it is possible to organize the device to attain various logic or system functions.

It is an object of my invention to detect functional relationships between input signals. More specifically, it is an object of my invention to selectively determine the function to be detected based solely upon the time relationship between certain of the previous input signals.

Another object of my invention is to provide a variable function arrangement utilizing magnetic domain technology whereby outputs representative of the functional relationships between input signals are selectively controlled by other input signals, and whereby once a particular function is selected the arrangement continues to provide outputs corresponding to that function until a new functional relationship between input signals is selected.

SUMMARY OF THE INVENTION

In one specific embodiment of my invention, I arrange the domain control elements geometrically to define a pair of input channels and an output channel. These channels are interrelated in coordinated fashion such that a domain propagated along the output channel at a certain instant of time represents a particular selected functional relationship between a domain propagated through a specific element in one of the input channels and a domain propagated through a coordinated specific element in the other input channel.

In accordance with an aspect of my invention, the particular functional relationship selected at any time is dependent upon the time relationship between domains propagated through the coordinated input channel elements.

In this illustrative embodiment, T and bar-shaped overlay elements are utilized to define the domain propagation channels and interaction points so that domains are propagated along the channels under control of the geometric structure of the elements and the repulsive forces of coincident domains all in response to a rotating in-plane field.

DESCRIPTION OF THE DRAWING

The operation and utilization of the present invention will be more fully apparent from the following description of the drawing in which:

FIG. 2 is a chart showing the relationship between the functions provided and the interaction points controlling those functions; and FIG. 3 through 12 are schematic drawings showing in greater detail certain interaction points.

It will be noted that a systematic designation has been employed to illustrate the movement of domains from posiJion to position and to facilitate a more complete understanding of the illustrative embodiment of the invention. Thus, a domain which is in a certain position at an arbitrary starting time is shown as a solid circle. As that domain moves from position to position along a defined channel of elements in response to a continuously changing magnetic field, broken circles are used for illustration. The letter associated with the position such as latter M in FIG. 3 serves to identify the position and to identify any domain thereat. The number associated with each such letter at a specific position represents the number of that position counting from an arbitrary starting position. Thus, corresponding numbers between domains in separate channels having coordinated starting positions indicate synchronously coordinated positions between the channels. The prime sign (') is used to denote an alternate position for a domain in the associated time slot. Thus, as shown in FIG. 3, M2 is the position in which the M domain will be one position after a starting position M1 if no force other than the force of the reorienting magnetic field is applied thereto. This path is called the preferred path of the domain and is marked symbolically by the letter P. When a domain encounters some other force, such as the repulsive force of a domain at a control point C (FIG. 3, position B1), instead of moving from the decision point D (FIG. 3, position M1) to the preferred point P (FIG. 3, position M2) the M1 domain moves to the alternate point A (FIG. 3, position M2'). The movement into the prime channel is termed the alternate path of the domain.

Figure 1:
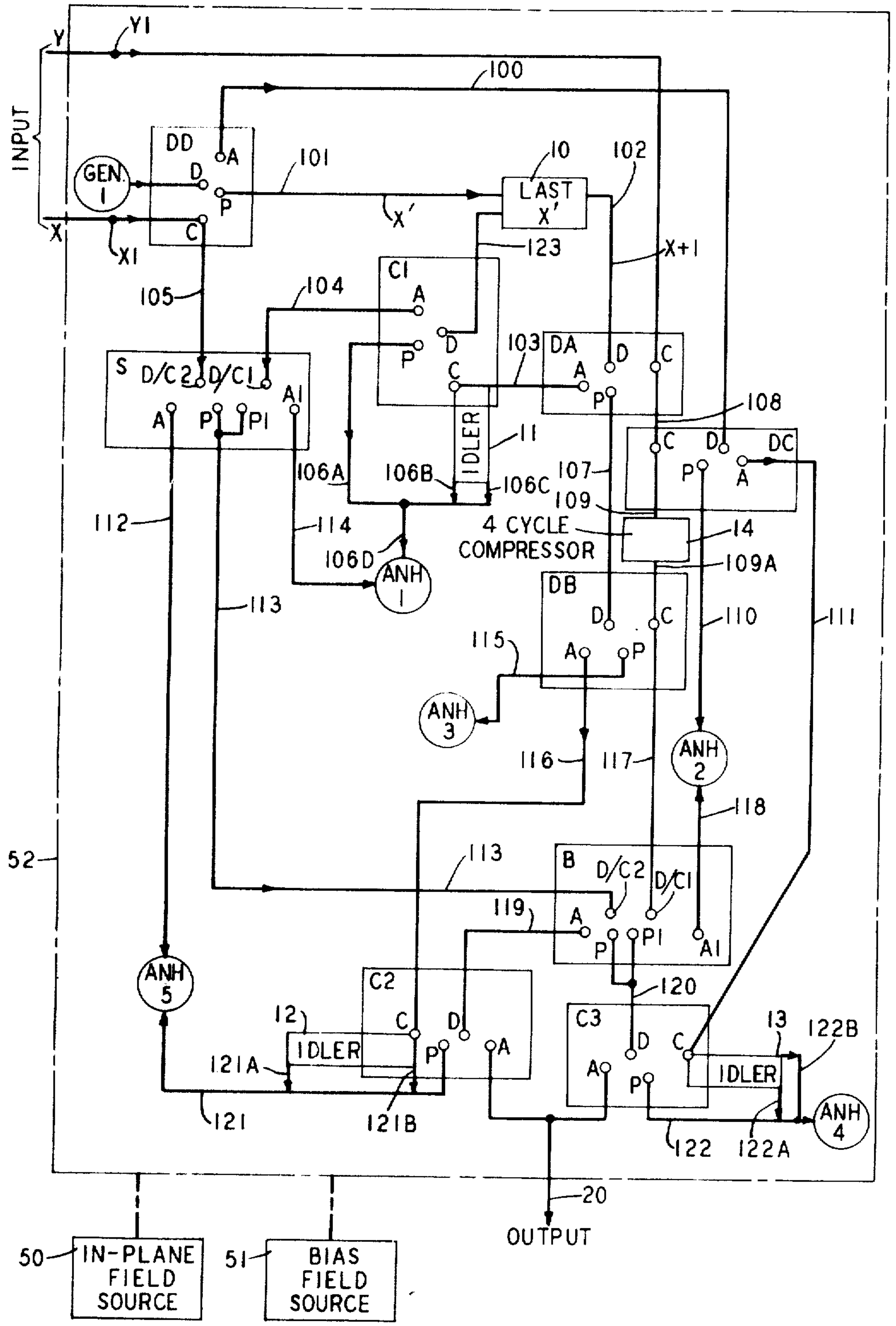
FIG. 1 is a schematic representation showing the interrelationship between the interaction points of the exemplary embodiment of the invention.

The A, D, P, and C points of each interaction point are utilized as shown in FIG. 1, to schematically represent the domain positions which are in coordinated relationship with each other to take advantage of the repulsive forces between domains. Thus, as shown with respect to interaction point DD, a small circle denotes point D which point represents the position of the domain at which a decision is required. Point P denotes the preferred position to which the domain from point D will move if no other force other than the force of a reorienting magnetic field is applied thereto. Point C denotes the position controlling the domain movement from point D such that when domains are concurrently at points C and D the point D domain will move to the alternate position A at the next reorientation of the magnetic field. The precise manner in which the movement of domains at an interaction point, such as at interaction point DD, is controlled, will be discussed in more detail hereinafter.

DETAILED DESCRIPTION

As shown in FIG. 1, in schematic form, two input channels X and Y are combined in a particular manner in a slice of material 52 in which single wall magnetic domains are propagated in response to a reorienting magnetic field, such as provided by IN-Plane Field Source 50 and Bias Field Source 51, to supply variable output functions on channel 20. The particular configuration shown is arranged to provide outputs representative of six distinct input relationships between coordinated domains propagated along the input channels. The precise output provided is controlled by the relative spacing between coordinated X and Y channel domains.

Six of the seven functions provided can be divided into two groups such that in one of the groups one of the inputs, such as the X input, is inverted to X' (complemented) prior to being functionally compared to the other input. In the embodiment, three functional comparisons are made with respect to each of the input domains, namely, the XY (AND), X+Y (OR), and the X ⊕Y (EXCLUSIVE OR (XOR)) functions. The symbolic representation of the functions available for the other group are: X'Y (inverted X, AND), X'+Y (inverted X, OR), and X'⊕Y (inverted X, XOR).

Domains at the C point of certain interaction points, such as at interaction points C1, C2, and C3, serve to select and control the specific output function desired. Domains for the respective C points of these interaction points are supplied by the relative spacing between coordinated input X and Y channel domains. Once a domain is provided to a particular C point of an interaction point that domain will remain at the respective C point until a second domain is supplied thereto at which time both the first controlling domain and the second domain will be removed.

The relationship between the functions, the control interaction point which provides those functions, and the particular time sequence between coordinated X and Y channel domains is shown in FIG. 2.

Thus, as shown with reference to FIG. 1 and 2, control interaction point C1 controls the inversion function. In turn, that interaction point is controlled by a two-cycle delay as detected at interaction point DA between domains on the Y input and on the X input. The AND function is controlled by domain interaction point C2 which point is controlled by a six-cycle delay between domains on the X and Y inputs. The EXCLUSIVE OR (XOR) function is controlled by domain interaction point C3 and a four-cycle delay between the X and Y inputs. The OR function, which is a combination of the XOR and AND functions, is controlled by domains concurrently at both of the C2 and C3 interaction points which domains are placed thereat by a six-cycle delay followed by a four-cycle delay or by delays of the reverse sequence.

The exact manner in which each of the interaction points functions will be detailed more fully hereinafter. However, prior to such a description it will be helpful to follow, in schematic form, domain propagation through the domain channels as shown in FIG. 1.

Establishment of EXCLUSIVE OR Function

When it is desired to select the XOR function a domain is propagated (either in response to electrical signals applied to a domain generator or as a result of a prior domain logic arrangement) over input channel X to point X1 followed four cycles later by a domain propagated over input channel Y to coordinated point Y1. The domain on channel X continues along channel X to interaction point DD and point C thereof. Concurrently therewith, domains from domain generator GEN1, which generator may be arranged as described in U.S. Pat. No. 3,555,527 issued Jan. 12, 1971 to A. J. Perneski, arrived at point D of interaction point DD. The domain at point C continues over channel 105 to interaction point S while the point D domain from domain generator GEN1 is repelled along the alternate path via point A of interaction point DD and along channel 100 to domain interaction DC. Thus, domains arriving at point D of interaction point DC represent domains propagated on input channel X in a one-to-one relationship therewith.

The Y input channel is constructed such that its length, as measured from point Y1 to point C of interaction point DC, is exactly 16 element positions (four cycles) shorter than the length of the combined X and 100 channels, as measured from point X1 to poing D of interaction point DC. Thus, when a domain at input point X1 is followed four cycles thereafter by a domain at input point Y1, domains representative of these time spaced input domains arrive concurrently at points D and C, respectively, of interaction point DC. The Y input domain at point C of interaction point DC causes the D point domain to move to point A and along channel 111 to point C of interaction point C3 and idler 13. The channel 111 domain then becomes the C3 idler domain and, in a manner to be more fully detailed hereinafter, that domain recirculates around idler 13 continuing to pass through point C of interaction point C3. The domain in idler 13 will remain trapped therein until such time as a second domain is propagated along channel 111 at which point the idler domain and the second channel 111 domain both move along path 122 to annihilation device ANH4, which annihilation device may be constructed as detailed in U.S. Pat. No. 3,577,131 issued May 4, 1971 to R. H. Morrow and A. J. Perneski. With a domain in idler 13 of control interaction point C3 the variable function arrangement is programmed for the XOR function such that when a domain is propagated exclusively along either channel Y or X, a domain is subsequently propagated along output channel 20 as an output signal.

To illustrate the XOR function with respect to the Y input, assume a domain is propagated to point Y1 while point X1 of the X input channel is vacant. The Y input domain would then propagate to and through point C of interaction point DA, point C of interaction point DC, 4 cycle compressor 14, point C of interaction point DB, and along channel 117 to point D/C 1 of interaction point B.

The overlay is constructed so that the sum of the number of positional elements defining channels X, 105, and 113 between point X1 and point D/C 2 of interaction point B is exactly equal to the sum of the positional elements defining channels Y, 108, 109, 109A, and 117, including 4 cycle compressor 14, between point Y1 and point D/C 1 of interaction point B. Accordingly, points D/C 1 and D/C 2 of interaction point B are coordinated points with respect to points Y1 and X1 such that the presence or absence of a domain at either point of interraction point B will depend upon the presence or absence of a domain at the respective point X1 or Y1 of the input channels at a precise prior instant of time.

Since the X input has been assumed to be vacant while the Y input has been assumed to have a magnetic domain therein in coordinated relationship to the vacant X input at a particular instant of time, at a fixed number of cycles of the reorienting magnetic field thereafter a domain is present at point D/C 1 of interaction point B while point D/C 2 of that interaction point remains vacant. Thus the domain at point D/C 1 moves to the preferred point P1 and along channel 120 during subsequent reorientations of the magnetic field.

The domain in channel 120 is propagated to point D of interaction point C3 and since a domain is currently in idler 13 (XOR configuration assumed) the domain from point D follows the alternate path and via point A of interaction point C3 along output 20 thereby providing an output domain as an indication that an input domain has been detected on only one of the input channels.

To illustrate the XOR functions with respect to the X input, assume now a domain at point X1 with point Y1 vacant. The X channel domain is propagated through interaction point DD and along channel 105 to point D/C 2 of interaction point S. Assuming no domain at point D/C 1 thereof at this time, the channel 105 domain moves along channel 113 to point D/C 2 of interaction point B. Since point D/C 1 is vacant due to the absence of a domain in the Y channel, the channel 113 domain moves to point P of interaction point B and via channel 120 to point D of interaction point C3. Since a domain is currently in idler 13, the channel 120 domain moves via point A into output channel 20 for propagation therealong as a representation of a detected XOR functional relationship between domains propagated in coordinated fashion along the input channels.

Digressing momentarily, it should be understood that the time differential between the input points X1 and Y1 and interaction point B is a function of the number of elements along which the domain is propagated and the rate of magnetic field reorientations. A typical example would be 20 cycles on 80 elements between points X1 and D/C 2 and between points Y1 and D/C 1. At a 1-megahertz frequency of the reorienting magnetic field this would equal a propagation time of 20 microseconds. The length of the path from interaction point B to output channel 20 would have a typical length of four cycles or 16 elements and thus the total time required to process an input signal would be approximately 24 microseconds at a 1-megahertz frequency of the reorienting magnetic field. Utilizing these dimensions the illustrative embodiment would require about 115 mils by 130 mils of surface area and an array of seven by eight of these circuits could be placed on a platelet one inch square. If it were desired to decrease the processing time of the embodiment, path compressors similar to compressor 14 could be utilized in channels 113, 117, and 111 or in channels Y, 101, and 100.

Continuing now with respect to FIG. 1, when a domain is present on the X input at point X1 and followed four cycles thereafter by a domain on the Y input at point Y1 these domains, as discussed previously, will be coincident at interaction point DC thus causing a domain to be propagated along channel 111 thereby clearing idler 13 and removing the domain from interaction point C3 in the manner to be more fully detailed hereinafter. Thus, if nothing else were done at this time a domain propagating along either the X or the Y channels arriving at interaction point B from either of channels 113 or 117 would pass via channel 120 to point D of interaction point C3. Since the domain has been removed from idler 13 and point C thereof, the domain from channel 120 passes into channel 122 to annihilation device ANH4 thereby preventing output channel 20 from having a domain propagated therealong.

Establishment of The AND Function

Now, assuming the AND function is desired, a domain is propagated through point X1 of the X input channel. Six cycles thereafter a domain is propagated through point Y1 of the Y channel. The domain in the Y channel is propagated through point C of interaction point DA, point C of interaction point DC, to four cycle compressor 14 and then to point C of interaction point DB. 4 cycle compressor 14 is constructed as detailed in U.S. Pat. No. 3,623,034 issued Nov. 23, 1971 to P. I. Bonyhard and I. Danylchuk, and functions to effectively shorten the number of cycles required for a magnetic domain to propagate a certain distance. Thus, a domain entering the compressor alo channel 109 during one quadrant of the rotating magnetic field will cause a representative domain to leave the compressor at that same quadrant 16 positions further down channel 109A. Accordingly, if a domain in a certain position along channel 109 is four cycles behind a coordinated domain along channel 107 when the channel 109 domain leaves compressor 14 along path 109A the coordinated domains in the respective channels will be in equal positions and will arrive at points D and C of interaction point DB concurrently. Of course, another method for achieving this result would be to make the length of channel 107 16 positions longer than the length of channel 109, however, this arrangement has the slight disadvantage of adding total propagation time to the arrangement.

Working backward from interaction point DB and keeping in mind that it is now desired to provide coincident domains at points D and C so as to provide a domain for idler 12 of interaction point C2, it is important to remember that coincidence at interaction point DB is controlled by a six-cycle difference between the X and Y inputs. Four of those cycles are made up by compressor 14 in the manner discussed above. The other two cycles therefore must be made up by adjusting the positional elements from point X1 which define channel X and channels 101 and 102. One of the cycles is made up, as will be more fully detailed hereinafter, by last X' circuit 10 and the other cycle is made up by adjusting the length of channel 102 with respect to the length of channel Y. Accordingly, a two-cycle difference is inherent at interaction point DA and a six-cycle difference is inherent at interaction point DB between domains having coordinated positions X1 and Y1.

The use of the 101 and 102 paths for cycle comparison instead of the 100 path will now be discussed. Prior to the propagation of domains along the X channel, the X channel has vacant positions therealong. Accordingly, domains propagated from domain generator GEN1 to interaction point DD continue along channel 101. As a consequence doaminsalong channel 101 represent te X' or the inverse of X. Thus, as long as no domains appear in the X channel domains continue to be propagated along channel 101 to circuit 10. Circuit 10 is constructed in a manner to be more fully detailed hereinafter such that upon the detection of a last domain in a chain of domains, a domain will be propagated along output channel 102 thereof. Accordingly, as illustrated in FIG. 1, when the domain representative of the control domain for the AND configuration is propagated from point X1 to point C of interaction point DD the domains from generator GEN1 are repelled along the alternate path 100. Accordingly, the X input domain causes a last domain (the domain in a position one cycle ahead of the vacant 101 channel position) to be propagated along the X' input to circuit 10. Last X' circuit 10 thereupon provides a domain along channel 102 to point D of the interaction point DA.

One fact is important to note with respect to the domain propagated along channel 102, namely, that that domain is representative of the last X' domain and thus is one cycle ahead of the X domain which caused the vacant position in the 101 channel. Thus, the representative domain output is advanced one cycle from the positlon it would occupy based solely upon a count of elemental positions of the channels 101 and 102. This cycle advance, therefore, must be taken into account in the design of the various channel lengths so that a domain propagated through point X1 will cause a domain to be propagated through point D of interaction point DA two cycles after a coordinated Y1 domain would be propagated through point C of interaction point DA. In other words, in the situation where the Y input domain lags the input domain by two cycles a pair of domains representative of these domains will arrive concurrenty at points C and D of interaction point DA.

Since for the establishment of the AND function the Y input lags the X input by six cycles and since the Y channel domain is propagated through a path two cycles shorter between point Y1 and point C of interaction point DA than the propagation path of the X input domain betweeen point X1 and point D of the DA interaction point, the respective domain representations will arrive at that interaction point still separated by four cycles. Thus, the channel 102 domain follows the preferred path 107 to point D of interactiong point DB. The Y channel domain, which lags the X channel domain by four cycles, follows path 108 and through point C of interaction point DC to the input of 4 cycle compressor 14.

As discussed previously, when an input domain arrives at compressor 14 a domain is immediately propagated along the output channel 109A in a position four cycles advanced from the input domain. Thus, the 109A channel domain arrives at point C of interaction point DB concurrently with the arrival at point D of the 107 channel domain if the domains that these domains represent had been six cycles apart at points X1 and Y. Accordingly, the channel 107 domain takes the alternate path to point A of interaction point DB and along channel 116 to point C of interaction point C2, thereby becoming trapped by idler 12 in the same manner as previously described for the first domain propagated to idler 13. The circuit is now configured to perform the AND function under control of the domain in idler 12 of interaction point C2.

Let us now observe the operation of the channels with respect to a set AND function. If domains are propagated concurrently through points X1 and Y1, these domains will arrive concurrently at points D/C 2 and D/C 1, respectively, of interaction point B thereby mutually repelling each other such that the domain at point D/C 1 moves to point A1 and is annihilated by annihilation device ANH2, while the domain at point D/C 2 moves to point A and is propagated along channel 119 to point D of interaction point C2. Since a domain is now present at point C, as controlled by idler 12, the domain along channel 119 is moved along the alternate path and along output 20, thereby providing an output domain whenever the input domains are in the AND relationship. As discussed previously, when an input domain is exclusively on one of the input channels, that domain will propagate through interaction point B and along channel 120 to interaction point C3. However, at this time there is an absence of a domain in idler 13 and the domain from channel 120 representing the XOR function moves along preferred channel 122 and is annihilated by annihilation device ANH4.

When it is desired to provide the OR function (a domain on either input or on both inputs), a domain is placed in idler 12 as well as in idler 13 suc that when inputs are present on either of the X or Y input channels, control interaction point C3 serves to direct OR'd input representations from channel 120 along output channel 20, and when thP inputs are in the AND relationship output 20 receives domains representative of detected AND relationships via interaction point C2.

INVERSION OF X INPUT

Up to this point I have discussed, with reference to FIG. 1, the configuration of the variable function magnetic domain arrangement to provide three functions, AND, EXCLUSIVE OR(XOR), and OR, using X and Y inputs to provide the desired output. In certain situations it is desirable to provide the above-mentioned functions with respect to the inverse of one of the input variables. Accordingly, the embodiment has been arranged to illustrate the provision of the functions X'Y (inverted X, XOR), X'+Y (OR), and X'+Y (XOR). Control for these functions is by the propagation of a domain along channel X followed two cycles thereafter by a domain propagated along channel Y.

Thus, as discussed previously, at a certain point after a domain is propagated through point X1 along input channel X a domain will be propagated along channel 102 tO poinJ D of interaction point DA. This domain arrives at interaction point DA concurrently with a domain propagated along channel Y lagging the X input channel domain by two cycles. Thus, the channel 102 domain moves via point A into channel 103 and becomes trapped by idler 11. The domain in idler 11 remains thereat to control the X' function until removed via a subsequently propagated domain, as discussed above.

Since the functions we are concerned with at this point relate to the inverse function of X, (X') it should follow then that when a domain begins at point X1 of channel X that representative coordinated domain position sould be vacant along channel 113 to interaction point B, whereas when a particular domain position is vacant on the X input the corresponding coordinated position along channel 113 should contain a domain.

Because control of the various functions of the variable function circuit is derived by the relative positions between the domains on the X and Y channels, it follows therefore that between each set of input signals, or domains, at least seven cycles must elapse in order to prevent the relative spacing between different domain sets from causing the arrangement to become reconfigured. Thus, for at least six cycles between each set of input signals, no domains should appear on the X or Y inputs. Thus circuit 10, between input sets will have a continuous stream of domains (X') propagated thereto, which stream moves through circuit 10 and along channel 123 to point D of interaction point C1. In the normal situation where idler 11 is vacant these domains pass into the preferred channel via point P and along channel 106A to annihilation device ANH1. When idler 11 contains a recirculating domain, the channel 123 domains move along channel 104 to point D/C 1 of interaction point S.

When a domain is propagated along the X input representative of a signal on the X input a domain is removed from the stream of domains along channel 101, as discussed previously. Thus, one domain is provided at the output of circuit 10. However, the domains in channel 101 previous to the last domain continue to be propagated along channel 123 to point D/C 1 of interaction point S. Since, as discussed above, at least seven cycles must elapse between each function on the input channel the supply of domains passing through circuit 10 is substantially continuous.

When a domain appears on channel X this domain is propagated along channel 105 to point D/C 2 of inter action point S. Since the circuit is arranged to provide the inverse function with respect to the X input, the domain at point D/C 2 and the domain at point D/C 1 provide repulsive forces on each other such that the channel 105 domain moves through point A and into channel 112 thereby being annihilated by annihilation device ANH5, while the domain at point D/C 1 moves into channel 114 to be annihilated by annihilation device ANH1. Thus, channel 113, at a position corresponding to a position in input channel X, contains no domain. Thus the X' function with respect to the X input is provided to interaction point B.

Similarly, when there is a vacant position along the X input that vacant position is propagated to point D/C 2 of interaction point S. The domain at point D/C 1 of interaction point S is then free to move to the preferred point P1 thereby entering channel 113. Thus, when a position in channel X is vacant the corresponding position in channel 113 containS a domain again providing the X' function with respect to the X input. Interaction points C2 and C3 are contolled in the manner previously described such that domains arriving along the X' (channel 113) input and domains arriving along the Y (channel 117) input interact at interaction point B to provide the AND, OR, or the XOR domain representations which representations are propagated along output channel 20 under control of domains in idler 12 or 13.

OPERATION OF INTERACTION POINTS

The precise manner in which the interaction points control the flow of domains will now be described for certain representative interaction points. The most common interaction point is a type, such as shown by interaction point DD, where a domain arrives at a point D which domain may move normally to the P or preferred position in the absence of any force other than the rotating magnetic force being applied thereto. Thus, as shown in FIG. 3, a domain arriving along path BG1 follows arrow 301 to position M1 corresponding to point D of interaction point DD. At the next quadrant of the rotating magnetic field the domain from position M1 moves to position M2 corresponding to point P of interaction point DD. Thus, at subsequent quadrants the domain moves out along path 101 which is the preferred path.

As shown in FIG. 4, when a domain, such as domain M1, is propagated to point D, concurrently with the propagation to point C of a control domain along channel X, such as domain B1, the repulsive force f1 between these domains causes the domain at position D to move to the alternate position A. Thus, a domain arbitrarily at point M1 will move at the next quadrant of the rotating magnetic field to point M2' under control of repulsive force f1 between domains M1 and B1. The domain moved to position M2' moves along the output path 100 while the domain from position B1 moves during subsequent quadrants of the rotating magnetic field, along channel 105 since with respect to point C there is no alternative path.

Figure 5:
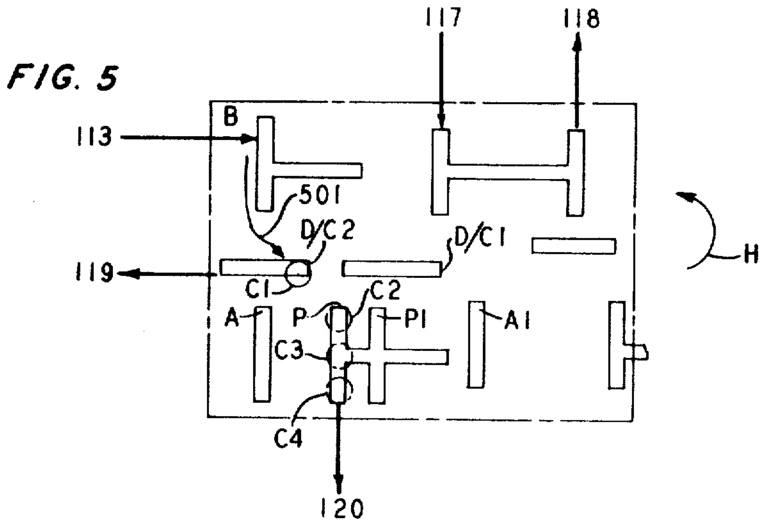

FIG. 5 shows an interaction point arranged to provide the AND and the OR function. Such an interaction point is representative of the interaction points S and B. in the illustrative embodiment. Thus, as shown with reference to FIG. 5, a domain entering interaction point B along channel 113 is propagated along the path shown by arrow 501 to position C1 corresponding to point D/C 2 of interaction point B. The notation D/C represents a point where a domain is both a decision domain and a control domain. At the next quadrant of the rotating magnetic field the C1 domain moves to position C2 corresponding to point P and thus moves along respective points C3 and C4 during subsequent quadrants of the rotating magnetic field. The domain then passes along output channel 120.

Figure 6:
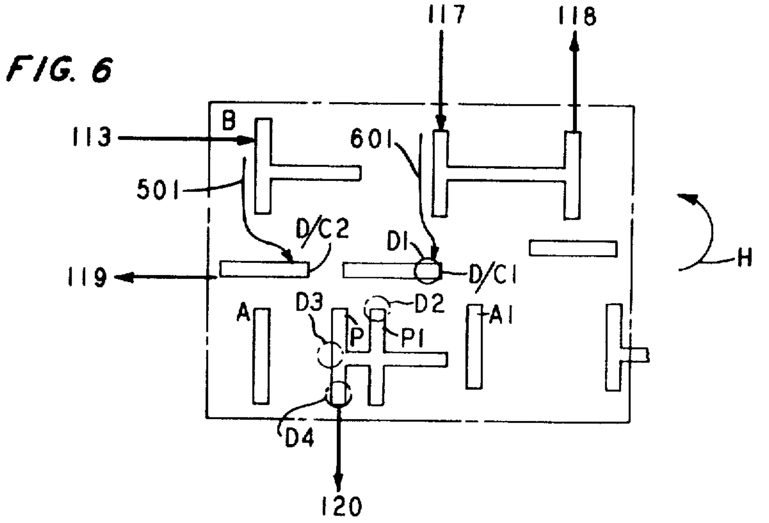

As shown with reference to FIG. 6, domains moving along channel 117 of interaction point B follow the path shown by arrow 601 to domain position D1 corresponding to poing D/C 1. At the next quadrant of the rotating magnetic field the D1 domain moves to position D2 corresponding to point P1 and during subsequent quadrants of the rotating magnetic field moves through positions D3, D4, and along channel 120. Thus, as shown in FIG. 5 and 6, the OR function is performed by interaction point B such that a domain moving along channel 113 or along channel 117 will be subsequently propagated along channel 120.

Figure 7:
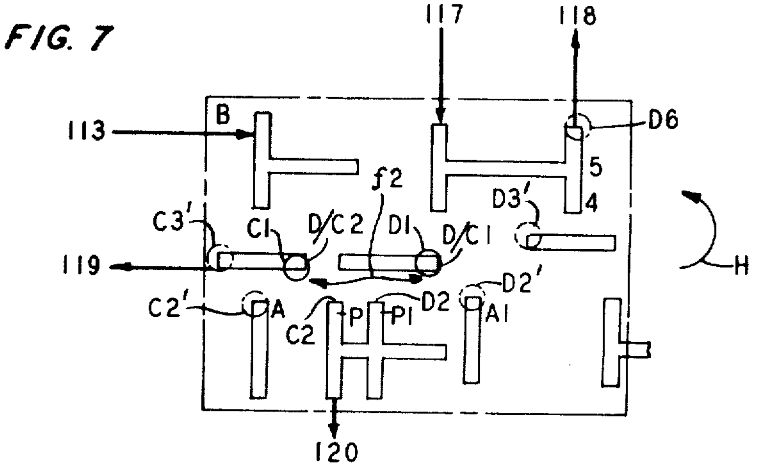

FIG. 7 illustrates the AND function as performed by interaction point B such that when domains are propagated thereto concurrently on channels 113 and 117 those domains arrive at positions C1 and D1 corresponding to domains at points D/C 2 and D/C 1, respectively. These domains exert a repulsive force such as force f2 on each other such that at the next quadrant on the rotating magnetic field the domain at position C1 moves to a position C2′ (point A) while the domain at position D1 moves to position D2′ (point A1). Thus, the domain propagated along channel 113 is propagated along 119 while the domain propagated along channel 117 is propagated along channel 118 thereby providing the AND function.

The operation of the last X′ circuit 10 will now be described with reference to FIG. 8 and 9. Domains, it will be recalled, are propagated along channel 101 representative of the inverse of X (X′) with respect to the X input. Thus, assuming a continuous stream of domains on channel 101, there will be a domain present at positions I1, H1, G1 and J1 at one quadrant of the magnetic field. The G1 and H1 domains provide a repulsive force, such as force f3, on each other to counteract the force f4 between the G1 domain and domain J1 such that at the next quadrant of the rotating magnetic field the domain at position G1 moves to the preferred path point P corresponding to domain position G2. At subsequent quadrants of the rotating magnetic field the G1 domain moves through positions G3 and G4 and out along channel 123. Concurrently, the H1 domain moves through positions H2, H3, and H4 while the I1 domain moves through positions I2, I3, and I4. As long as domains continue uninterrupted along channel 101 the last X′ arrangement continues to function in this manner.

Figure 8:
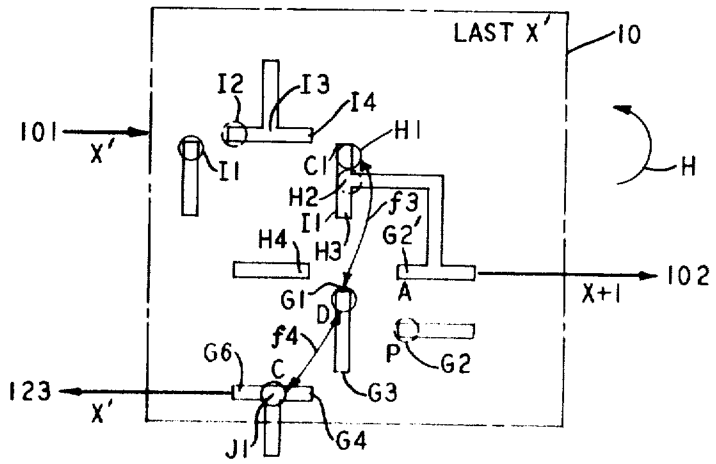
Figure 9:
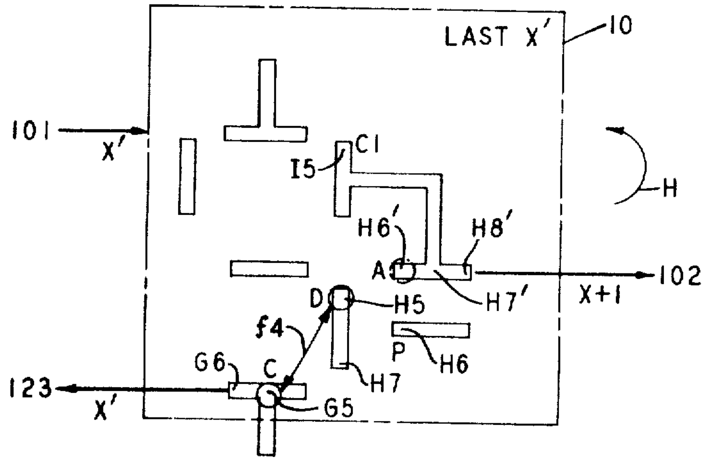

FIG. 9 shows a situation where a domain has been removed from the stream of domains arriving along channel 101 such that the domain which had been in position H1 of FIG. 8 is now shown one cycle later (four quadrants of the rotating magnetic field) at position H5 while position I5 corresponding to the position where the I1 domain of FIG. 8 would be one cycle later is vacant. At this time the G1 domain has moved to point C corresponding to position G5 of FIG. 9. The G5 and H5 domains provide a repulsive force, such as force f4, on each other which force is not now counterbalanced because position I5 is vacant and thus at the next quadrant of the rotating magnetic field the domain from position H5 moves to the alternate position H6′ and subsequently through positions H7′ and H8′ and along channel 102. Thus, the domain propagating along channel 102 represents the situation where a stream of domains has been provided along input channel 101 and where out of the domains has been removed from that stream.

It should be noted that the domain which had been removed is a domain corresponding to the I1 domain of FIG. 8 while the domain which is propagated along channel 102 is the domain corresponding to the H1 domain of FIG. 8. Thus, as discussed previously, the domain moving along channel 102 representative of the last domain is in reality a domain which has been advanced from its normal position by one cycle. Thus, this advancement of a domain with respect to its position must be taken into account in the domain pattern channel of 102 such that, with reference to FIG. 1, the domain corresponding to the domain in channel 102 arrives at interaction point DA concurrently with the coordinated domain position of the Y channel.

Figure 10:
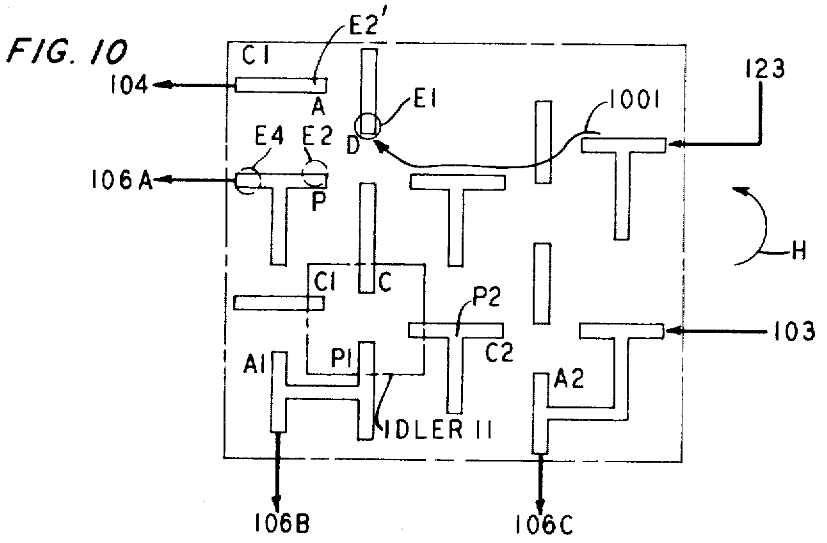

One further type of interaction point remains to be discussed, namely, the interaction point containing the idler domains, such as interaction point C1 containing idler 11. As shown in FIG. 10, a domain entering interaction point C1 along channel 123 follows the channel marked by arrow 1001 such that the domain arrives at point D corresponding to position E1. In the event that there is no domain the idler 11 when domain E1 arrives at point D that domain moves along the preferred path to point P corresponding to domain position E2. During subsequent reorientations of the rotating magnetic field the E1 domain moves along channel 106A.

Figure 11:
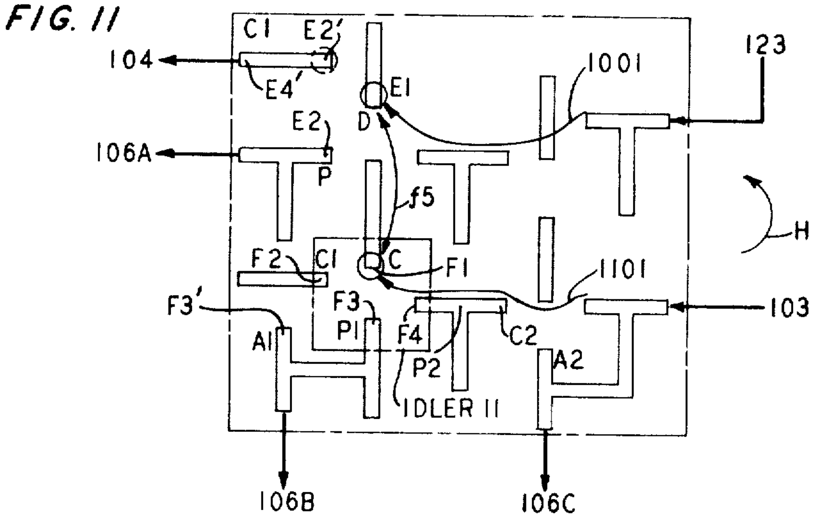

FIG. 11 illustrates a situation where domain has moved along channel 123 to position E1 concurrently with the movement of a domain along channel 103 (shown by arrow 1101) to point C corresponding to doamin position F1. Since at this point the respective domains E1 and F1 exert a mutually repulsive force, such as force *f*5, on each other the domain from position E1 moves to position E2′ and thereafter at subsequent reorientation to the magnetic field that domain moves along alternate channel 104. Concurrently therewith the domain from position F1 moves through positions F2, F3, and F4. At the completion of a full cycle, therefore, the F1 domain is again in position F1 and in this manner is trapped in the respective positions F1, F2, F3, and F4 and recirculates therethrough continuously until some force other than the force of the rotating magnetic field and other than the force *f*5 is applied.

Figure 12:
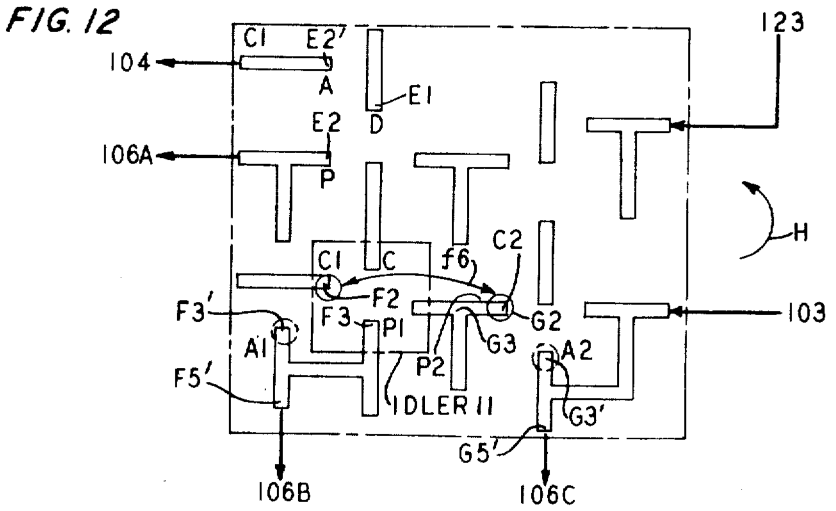

As shown in FIG. 12 and discussed previously, the force necessary to remove domain F1 from the idler 11 is a second channel 103 domain. Thus, as shown, assuming the idler domain to be in position F2 and assuming that a second domain moves along channel 103, that second domain arrives at point G2 when the idler domain is in position F2. The preferred point for the G2 domain at the next reorientation of the magnetic field is position G3. However, since the F2 domain and the G2 domain exert a mutually repulsive force, such as force *f*6, on each other the G2 domain moves along the alternate path at the next quadrant of the reorienting magnetic field such that the domain arrives at point A2 corresponding to position G3′. Concurrently therewith, the domain from position F2 moves along the alternate path and point A1 to position F3′. Thus, the idler domain leaves idler 11 and moves along path 106B while the second domain propagated along channel 103 does not enter the idler at this point but propagates instead along channel 106C. Accordingly, the interaction point C1 is cleared such that domains moving along channel 123 to point E1 again propagate through the preferred point P and continue along channel 106A until such time as another domain is propagated along channel 103 which other domain becomes trapped in idler 11 in the manner just described.

Conclusion

While the equipment of the invention has been shown in a particular embodiment wherein the functional relationship between domains propagated along a pair of input channels has been selectively represented on a single output channel, it is understood that such an embodiment is intended only to be illustrative of the present invention and numerous other arrangements may be devised by those skilled in the art without departing from the spirt and scope of the invention.

For example, more than two input channels may be combined to provide output signals representative of functional relationships between domains on all or on certain combinations of the input channels. In addition, separate output channels may be utilized, each for providing an output representative of one particular function. Also, functional relationships other than those detailed herein may be represented by domains propagated along the output channels.

As a further example, a group of variable function circuits may be arranged in a matrix configuration such that the output of one circuit may be utilized as an input to another circuit. In such an arrangement, by utilizing the concept of selectively controlling the function of each circuit by the time relationship between input signals to that circuit, the inherent complexity of using separate control leads associated with each circuit for establishing each desired function is eliminated.

What is claimed is:

1. A geometry of elements adapted for controlling the directional movement of magnetic domains in a slice of magnetic material in response to a magnetic field reorienting in a plane of said slice, said elements defining a pair of input channels and an output channel, a plurality of control channels connecting said input channels to said output channel, a plurality of interaction points arranged along said control channels between said input channels and said output channel each adapted for determining a unique time relationship between certain domains propagated on said control channels, a functional relationship interaction point arranged along said control channels between said input channels and said output channel adapted for determining when coordinated ones of said domains moving along said control channels are in a first functional relationship with each other and for determining when said coordinated domains are in a second functional relationship with each other, and a first output interaction point controlled by said functional relationship interaction point and by said plurality of time relationship interaction points, said first output interaction point operative in conjunction with a determined first functional relationship and with a determined first time relationship for providing a domain for movement along said output channel.

2. The invention set forth in claim 1 wherein said first output interaction point is further controlled by said functional relationship interaction point and by said plurality of time relationship interaction points and operatlve in conjunction with a determined first functional relationship and with a determined time relationship other than said first time realtionship for inhibiting said output channel domain.

3. The invention set forth in claim 2 wherein said first functional relationship is the AND relationship between coordinated input channel domains.

4. The invention set forth in claim 1 wherein said elements further define a second output interaction point controlled by said functional relationship interaction point and by said plurality of time relationship interaction points, said second output interaction point operative in conjunction with a determined second functional relationship and with a determined second time realtionship for providing a domain for movement along said output channel.

5. The invention set forth in claim 4 wherein said second output interaction point is controlled by said functional relationship interaction point and by said plurality of time relationship interaction points and further operative in conjunction with a determined second functional relationship and with a determined time relationship other than said second time relationship for inhibiting said output channel domain.

6. The invention set forth in claim 5 wherein said second functional relationship is the XOR relationship between coordinated input channel domains.

7. The invention set forth in claim 1 wherein said elements further define an inverting interaction point controlled by said functional relationship interaction point and by said plurality of time relationship interaction points, said inverting output interaction point operative in response to a determined third time relationship for functionally inverting domains representative of domains moving in one of said input channels.

8. The invention set forth in claim 1 wherein said elements further define an idler controlled by said time relationship interaction point and arranged in conjunction with said first output interaction point for maintaining said first interaction point in a determined first time relationship without regard to time relationships other than said first time relationship between coordinated domains moving along said input channels subsequent to said movement along said input channels of coordinated domains in said first time relationship.

9. The invention set forth in claim 8 wherein said idler is further arranged for releasing said first output interaction point from a maintained first time relationship upon a subsequently determined first time relationship.

10. The invention set forth in claim 9 wherein said elements further define a second output interaction point controlled by said functional relationship interaction point and by said plurality of time relationship interaction points, said second output interaction point operative in conjunction with a predetermined second functional relationship and with a determined second time relationship for providing a domain for movement along said output channel, and an idler controlled by said time relationship interaction point and arranged in conjunction with said second output interaction point for maintaining said second interaction point in a determined second time relationship without regard to time relationships other than said second time realtionship between coordinated domains moving along said input channels subsequent to said movement along said input channels of coordinated domains in said second time relationship.

11. The invention set forth in claim 10 wherein said first output interaction point is operative to provide the AND function between coordinated inputs and wherein said second output interaction point is operative to provide the XOR function between coordinated inputs.

12. A variable function gate comprising a slice of magnetic material in which single wall magnetic domains can be propagated and a pattern of elements for controlling the directional movement of said domains in said magnetic material, said elements defining first and second input channels along which domains may be propagated, an output channel for propagating a domain in response to a first functional relationship between coordinated domains propagated concurrently along both of said input channels and for propagating a domain in response to a second functional relationship between coordinated domains propagated exclusively along either of said input channels, and control channels connecting said input channels to said output channel, said control channels operative in response to a first time relationship between coordinated domains propagated along said input channels for enabling said first function and operative in response to a second time relationship between coodinated domains propagated along said input channels for enabling said second function.

13. The invention set forth in claim 12 wherein said control channels are operative in response to said first time relationship for supplying a first control domain to said output channel for controlling said first function and operative in response to said second time relationship for supplying a second control domain to said output channel for controlling said second function.

14. The invention set forth in claim 13 wherein said output channel is arranged to maintain any said supplied domain in proximity thereto so that said output channel continues to provide the function associated with said supplied domain.

15. The invention set forth in claim 14 wherein said output channel is further arranged to remove a first supplied first control domain upon a second supplied first control domain being supplied thereto and to remove a first supplied second control domain upon a second supplied second control domain being supplied thereto.

16. The invention set forth in claim 15 wherein said output channel is further arranged to prevent a second supplied first control domain and a second supplied second control domain from being maintained in proximity to said output channel.

17. The invention set forth in claim 13 wherein said elements further define a plurality of interaction points between said input channels and said output channel for compariing the presence of a domain in one of said input channels with the presence of a coordinated domain in the other of said input channels, the coincidence between said compared domains being operative for supplying said control domains to said output channel.

18. An arrangement for selectively providing outputs in response to various functional realtionships between input signals comprising a plurality of input channels, an output channel, means for moving data bits representative of said input signals in a coordinated manner along said input channels, means for detecting the time differential between coordinated domains in certain of said input channels, means for detecting the functional relationships between coordinated domains in certain of said input channels, and means operable in response to a detected first time differential for controlling domain propagation along said output channel as an indication of a first one of said functional relationships.

19. The invention set forth in claim 18 further comprising means operable in response to a detected second time differential for controlling domain propagation along said output channel as an indication of a second one of said functional relationships.

20. The invention set forth in claim 19 further comprising means for inverting data bits propagated along a first one of said input channels, and means operable in response to a detected third time differential for controlling in conjunction with either said detected first or said detected second time relationship domain propagation along said output channel as an indication of one of said functional relationships with respect to the inverse of said input channel data bit.

21. The invention set forth in claim 19 wherein said functional relationship detecting means includes means for circulating domains representative of said first functional relationship to said output channel over a first path and for circulating domains representative of said second functional relationship to said output channel over a second path, and means in each of said first and second paths for inhibiting the circulating of domains to said output channel.

22. The invention set forth in claim 21 wherein said time differential detecting means includes a plurality of interaction points for determined the coincidence of domains propagated thereto on a pair of domain propagation channels, a plurality of domain propagation channels each for circulating to certain of said interaction points data bits representative of said input signal data bits on each of said input channels, and means for adjusting the effective length of each channel of a pair of channels at one of said interaction points such that coincidence occurs at said interaction point whenever a domain circulates through one input channel a fixed time before a coordinated domain circulates through another input channel.

23. The invention set forth in claim 22 further comprising means for circulating a domain representative of each said determined coincidence from one of said interaction points to a particular one of said first and second path inhibiting means for controlling the propagation into said output channel of any domain propagated along said particular one path.

24. The invention set forth in claim 23 wherein each inhibiting means includes means for maintaining thereat a domain circulated thereto from one of said interaction points such that domains propagated along said path associated with said inhibiting means continue to be propagated into said output channel.

25. The invention set forth in claim 24 wherein each said inhibiting means further includes means for causing said maintaining domain to be circulated therefrom whenever another domain is circulated thereto from an associated interaction point.

26. In combination with a slice of magnetic material for moving magnetic domains therein in response to a magnetic field reorienting in a plane of a slice, an arrangement for selectively providing outputs representing various functional relationships between inputs comprising a pair of input channels, an output channel, at least one control interaction point connected to said output channel and responsive to domains appearing at said input channel, and means for determining the functional relationship detected by said control interaction point dependent upon the time relationship between domains in said pair of input channels, said means including a plurality of domain propagation paths and a plurality of additional interaction points connecting said input and output channels to said propagation paths.

27. The arrangement of claim 26 wherein certain of said domain propagation paths are effectively of different lengths dependent upon the functional relationship to be detected.

* * * * *